Sept. 6, 1932.  C. REICHERT, SR., ET AL  1,876,075

ELECTRIC CUTTING MACHINE FOR CUTTING OUT WOVEN FABRICS

Filed May 6, 1929   2 Sheets-Sheet 1

Inventors:
C. Reichert sr. &
K. Reichert jr.

By: Marks & Clark
Attys.

Patented Sept. 6, 1932

1,876,075

UNITED STATES PATENT OFFICE

CARL REICHERT, SR., AND KARL REICHERT, JR., OF CANNSTATT, GERMANY

ELECTRIC CUTTING MACHINE FOR CUTTING OUT WOVEN FABRICS

Application filed May 6, 1929, Serial No. 360,952, and in Germany May 16, 1928.

This invention relates to electric cutting machines with a disc-shaped revolving cutter, suitable for cutting out woven fabrics.

According to the invention the cutter is of non-circular shape, the periphery of the cutter following a single continuous curve, forming for instance an ellipse or an oval, or being composed of a plurality of curved portions, more particularly convex curved portions, for instance arcs of circles. It has been found that a particularly suitable shape of cutter is one, the periphery of which is composed of four circular arcs.

The cutter according to the invention will cut all and more evenly, the greater the number of projecting portions at its periphery with respect to the circle inscribed within the periphery. For instance, an elliptical cutter always cuts for one quarter of a revolution, then runs idle for one quarter of a revolution, then cuts again for one quarter of a revolution and so on. A cutter composed of four circular arcs always cuts for one eighth of a revolution and runs idle for only one eighth of a revolution.

The machine according to the invention operates somewhat after the manner of an ordinary pair of scissors, in which however the fulcrum of the scissor blades with respect to one another would be unsymmetrical with respect to the scissor blades.

The machine according to the invention has the special advantage that with it even the finest materials, such as thin silk, batiste, artificial silk, silk pile fabric, can be cut even in single layers, which would at least cause difficulties with a machine having a circular cutter, as, with a circular cutter, the point of contact between the cutting jaw and the edge of the cutter does not change its position.

In the accompanying drawings

Figure 1:
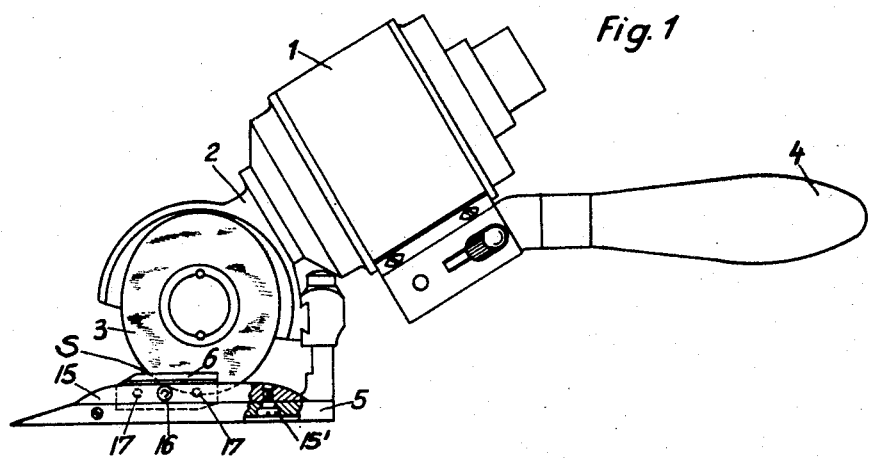
Fig. 1 is an electric cutting machine for woven fabrics, according to the invention and having an oval cutter.

The motor 1 is mounted on a frame 2 (Fig. 1) in which the oval cutter 3 is rotatably journalled. The handle 4 is screwed to the motor casing. On the frame 2 a foot part 5 with the cutting jaw 6 is mounted so as to be adjustable thereon.

The cutting point S between the cutting jaw and the cutter continuously changes its position during the rotary motion of the cutter, owing to the non-circular shape of the cutter, so that the scissor-like cutting action is obtained.

Figure 2:
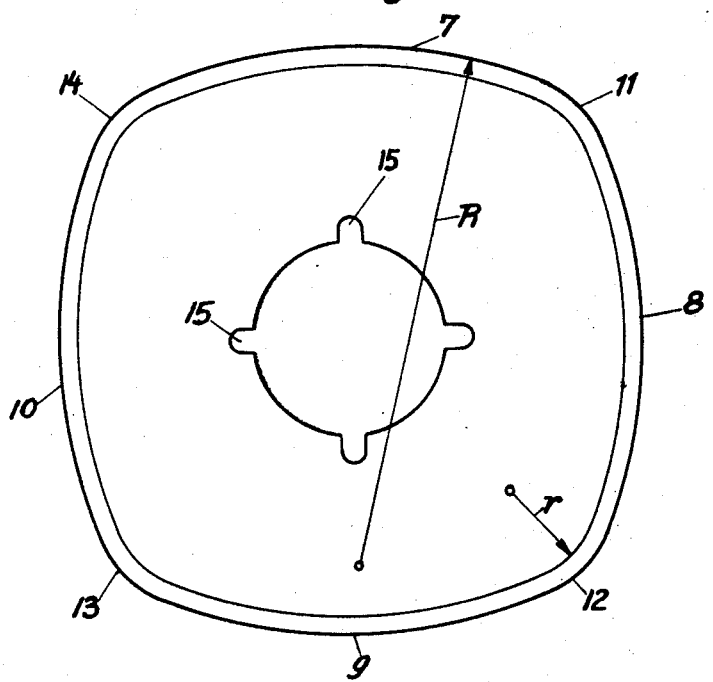
Fig. 2 represents a cutter composed of four circular arcs for the same machine.
Figure 3:
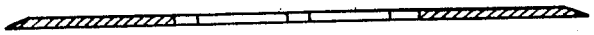
Fig. 3 is a cross-section through the cutter according to Fig. 2.

The cutter according to Figs. 2 and 3 is composed at its periphery substantially of four circular arcs 7, 8, 9, 10 having a radius R. In order to avoid sharp corners small circular arcs 11, 12, 13 and 14 of the radius $r$ are provided between the circular arcs 7, 8, 9, 10. The cutter is provided in the usual manner with a central hole for mounting it on the cutter carrier. The recesses 15 are provided for the engagement of a driving member.

Figure 4:
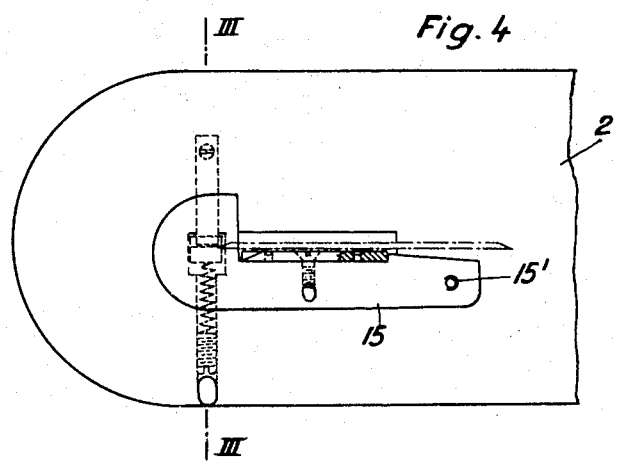
Figs. 4 to 6 show in plan view and in section on line III—III the base plate of the machine with a movable counter cutting blade, Figs. 4 and 5 showing the latter in the operative and Fig. 6 in the inoperative position.
Figure 5:
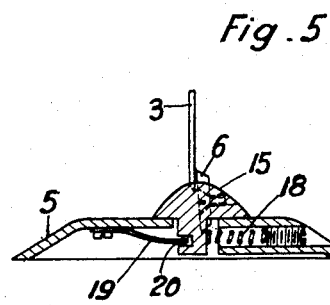

The counter cutting jaw consists of the cutter 6 which is held in the rocking arm 15. The cutter 6 is held by a central screw 16 and is secured from turning by pins 17. The abutment surface of the cutter 6 on the arm 15 is inclined downwards, so that, as shown in Fig. 4, the cutter 6 is inclined to the plane of the revolving cutter 3. A spring 18 serves the purpose of pressing the cutting jaw 6 which rocks about the pin 15' against the revolving cutter 3.

Under the base plate 5 is a spring 19 which, when the cutting jaw 6 is in the operative position, engages in a recess 20 in the cutting jaw, but, when the cutter is in the inoperative position, rests below the recess 20 against the side wall 21 of the arm 15, holding the latter in the locked position with the jaw 6 out of contact with the revolving cutter 3.

Figure 6:
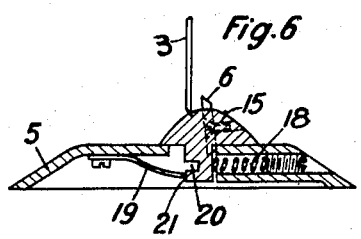

When the cutter is to be ground a grindstone of suitable shape is held against the cutter 3 either by hand or by means of suitable mechanism. Before the motor is started, the cutting jaw 6 is forced by hand away from the cutter. The spring 19 is thereby caused to snap downwards in front of the projection 21 and to lock with the cutting jaw in the position shown in Fig. 6, in which it is out of contact with the cutter. After grinding, in order to bring the cutting jaw back into contact with the cutter, it is only necessary to press on the spring 19 from below.

When the machine is in operation, the cutting jaw 6 with the arm 15 continuously swings to and fro under pressure of the spring 18, as the point of contact S between the cutter 3 and the cutting jaw 6 continuously changes its position both at the cutter and at the cutting jaw. If the cutting jaw were not made movable, it would not be possible to keep it pressed against the cutter 3 under a light spring pressure.

What we claim is:

1. In an electric cutting machine for cutting out woven fabrics, a non-circular rotary cutter having an uninterrupted cutting edge extending completely round its periphery and a counter cutting blade arranged on the machine in contact with the rotary cutter, as and for the purposes set forth.

2. In an electric cutting machine for cutting out woven fabrics, a non-circular rotary cutter having a periphery composed of a plurality of curved portions with an uninterrupted cutting edge extending completely round said periphery, and a counter cutting blade arranged on the machine in contact with the rotary cutter as and for the purposes set forth.

3. In an electric cutting machine for cutting out woven fabrics, a non-circular rotary cutter having a continuous cutting edge extending completely round its periphery and composed of a plurality of circular arcs, each having a radius greater than the maximum radius of said cutter.

4. In an electric cutting machine for cutting out woven fabrics, a non-circular cutter having a continuous cutting edge extending completely round its periphery, and composed of four circular arcs, each arc being disposed in general at 90° to the connecting arc, said arcs each having a radius greater than the radius of said cutter.

5. An electric cutting machine for cutting out woven fabrics, comprising in combination a base part, a non-circular rotary cutter, a counter cutting jaw mounted so as to be capable of motion in the said base part and resilient means for pressing the counter cutting jaw against the rotary cutter, as and for the purpose set forth.

6. An electric cutting machine for cutting out woven fabrics, comprising in combination a base part, a non-circular rotary cutter, a counter cutting jaw, a pivot pin in the said base part, on which the counter cutting jaw is mounted, so as to be capable of rocking thereon, and a spring for pressing the counter cutting jaw against the rotary cutter, as and for the purpose set forth.

7. An electric cutting machine for cutting out woven fabrics, comprising in combination a base part, a non-circular rotary cutter, a counter cutting jaw mounted so as to be capable of motion in the said base part, a spring for pressing the counter cutting jaw against the rotary cutter and locking means for locking the counter cutting jaw in a position in which it is out of contact with the rotary cutter, as and for the purpose set forth.

8. An electric cutting machine for cutting out woven fabrics, comprising in combination a base part, a non-circular rotary cutter, a counter cutting jaw mounted so as to be capable of motion in the said base part, a spring for pressing the counter cutting jaw against the rotary cutter, a recess in and a projection on the counter cutting jaw, a resilient tongue capable of engaging in the said recess when the counter cutting jaw is in the operative position and of resting against the projection when the counter cutting jaw is in the inoperative position, as and for the purpose set forth.

9. An electric cutting machine for cutting out woven fabrics, comprising in combination a base part, a non-circular rotary cutter, a counter cutting jaw mounted so as to be capable of motion in the said base part, a separate counter cutter blade mounted in the said counter cutting jaw and resilient means for pressing the said blade against the rotary cutter, as and for the purpose set forth.

10. An electric cutting machine for cutting out woven fabrics, comprising in combination a base part, a non-circular rotary cutter, a counter cutting jaw mounted so as to be capable of motion in the said base part, a separate counter cutter blade having two cutting edges capable of being mounted in the said counted cutting jaw with either cutting edge upwards and resilient means for pressing the said blade against the rotary cutter, as and for the purpose set forth.

11. An electric cutting machine for cutting out woven fabrics, comprising in combination a base part, a non-circular rotary cutter, a counter cutting jaw mounted so as to be capable of motion in the said base part, a separate counter cutter blade mounted in the said counter cutting jaw so as to be at an inclination to the plane of the rotary cutter and capable of making contact with it in one point only and resilient means for pressing the said blade against the rotary cutter, as and for the purpose set forth.

In testimony whereof we have signed our names to this specification.

CARL REICHERT, Senior.
KARL REICHERT, Junior.